(12) United States Patent
Komagome

(10) Patent No.: US 8,671,330 B2
(45) Date of Patent: Mar. 11, 2014

(54) STORAGE DEVICE, ELECTRONIC DEVICE, AND DATA ERROR CORRECTION METHOD

(75) Inventor: Yutaka Komagome, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 353 days.

(21) Appl. No.: 13/158,766

(22) Filed: Jun. 13, 2011

(65) Prior Publication Data

US 2012/0066568 A1 Mar. 15, 2012

(30) Foreign Application Priority Data

Sep. 14, 2010 (JP) ................................. 2010-206070

(51) Int. Cl.
*G11C 29/00* (2006.01)
*G06F 11/00* (2006.01)

(52) U.S. Cl.
USPC ............................ 714/768; 714/802; 714/805

(58) Field of Classification Search
None
See application file for complete search history.

(56) References Cited

U.S. PATENT DOCUMENTS

| | | | | |
|---|---|---|---|---|
| 6,269,034 | B1 * | 7/2001 | Shibuya | 365/194 |
| 6,882,592 | B2 * | 4/2005 | Noguchi et al. | 365/230.03 |
| 7,184,356 | B2 * | 2/2007 | Noguchi et al. | 365/230.03 |
| 7,359,260 | B2 * | 4/2008 | Mikol | 365/200 |
| 7,359,274 | B2 * | 4/2008 | Noguchi et al. | 365/230.03 |
| 7,506,199 | B2 * | 3/2009 | Ueno | 714/6.24 |
| 7,532,524 | B2 * | 5/2009 | Hartono et al. | 365/195 |
| 7,917,688 | B2 | 3/2011 | Tanaka et al. | |
| 2002/0029365 | A1 * | 3/2002 | Sato et al. | 714/763 |
| 2003/0204727 | A1 | 10/2003 | Sasaki | |
| 2005/0024974 | A1 * | 2/2005 | Noguchi et al. | 365/230.03 |
| 2005/0157578 | A1 * | 7/2005 | Noguchi et al. | 365/230.03 |

FOREIGN PATENT DOCUMENTS

| | | |
|---|---|---|
| JP | H2-159651 | 6/1990 |
| JP | 05-020200 | 1/1993 |
| JP | 06-067912 | 3/1994 |
| JP | 10-124384 | 5/1998 |
| JP | 2002-132586 | 5/2002 |
| JP | 2008-171163 | 7/2008 |

OTHER PUBLICATIONS

Japanese Office Action dated Sep. 6, 2011 for Japanese Application No. 2010-206070 filed on Sep. 14, 2010.

* cited by examiner

*Primary Examiner* — Daniel McMahon
(74) *Attorney, Agent, or Firm* — Knobbe Martens Olson & Bear LLP

(57) ABSTRACT

According to one embodiment, a storage device includes an error detector, a check module, and a replacement module. The error detector detects a bit error that occurs in entry data related to conversion to a physical address corresponding to a logical address based on an error detecting code assigned to the entry data. The check module checks, based on data obtained by inverting one bit among all bits of the entry data and on data read out from the physical address indicated by the obtained data, whether or not the obtained data is normal entry data. The replacement module replaces the entry data where the bit error is detected with the checked normal entry data.

20 Claims, 9 Drawing Sheets

FIG.3

| | | | | | | |
|---|---|---|---|---|---|---|
| PAGE OF LBA 0 TO 7 | PAGE OF LBA 8 TO 15 | PAGE OF LBA 16 TO 23 | ... | PAGE (BP) OF LBA (n) TO (n+7) | ... | ... |

31

| BIT | 31 | 30 | 29 | 28 | 24 | 23 | 19 | 18 | 6 | 5 | 0 |
|---|---|---|---|---|---|---|---|---|---|---|---|
| ENTRY | P | 0 | 0 | CHANNEL NUMBER | | CHIP NUMBER | | BLOCK NUMBER | | PAGE NUMBER | |

FIG.4

| BIT | 24 | ... | 31 | ... | 23 | 22 | 21 | 20 | ... | ... | ... | ... | ... | ... | ... | 3 | 2 | 1 | 0 |
|---|---|---|---|---|---|---|---|---|---|---|---|---|---|---|---|---|---|---|---|
| ENTRY 1 | ERROR CORRECTING CODE | | | | 23 | 22 | 21 | 20 | ... | ... | ... | ... | ... | ... | ... | 3 | 2 | 1 | 0 |
| ENTRY 2 | ERROR CORRECTING CODE | | | | 47 | 46 | 45 | 44 | ... | ... | ... | ... | ... | ... | ... | 27 | 26 | 25 | 24 |
| ... | | | | | ... | ... | ... | ... | ... | ... | ... | ... | ... | ... | ... | ... | ... | ... | ... |

BIT ERROR IS DETECTED IN ENTRY OF LBA x TO (x+7)

| BIT | 31 | 30 | 29 | ... | t | ... | 6 | 5 | 4 | 3 | 2 | 1 | 0 |
|---|---|---|---|---|---|---|---|---|---|---|---|---|---|
| ENTRY | 1 | 0 | 1 | | 1 | | 0 | 1 | 0 | 1 | 1 | 1 | 0 |

ER

CHECK VALUE Ch(0) (INVERTE 0th BIT 0)

| 1 | | | | 1 | | 0 | 1 | 0 | 1 | 1 | 1 | 1 |

CHECK VALUE Ch(1) (INVERTE FIRST BIT 1)

| 1 | | | | 1 | | 0 | 1 | 0 | 1 | 1 | 0 | 0 |

...

CHECK VALUE Ch(t) (INVERTE t-th BIT 1)

| 1 | | | | 0 | | 0 | 1 | 0 | 1 | 1 | 1 | 0 |

...

CHECK VALUE Ch(31) (INVERTE 31st BIT 1)

| 0 | | | | 1 | | 0 | 1 | 0 | 1 | 1 | 1 | 0 |

STORAGE DEVICE, ELECTRONIC DEVICE, AND DATA ERROR CORRECTION METHOD

CROSS-REFERENCE TO RELATED APPLICATIONS

This application is based upon and claims the benefit of priority from Japanese Patent Application No. 2010-206070, filed Sep. 14, 2010, the entire contents of which are incorporated herein by reference.

FIELD

Embodiments described herein relate generally to a storage device, an electronic device, and a data error correction method.

BACKGROUND

In recent years, as a storage device used in electronic devices such as personal computers (PCs), solid-state drives (SSDs) have attracted attention that include a flash memory, flash electrically erasable programmable read-only memory (EEPROM), which is a nonvolatile memory. Incidentally, an electronic device performs data access using a logical address, while a storage device performs data access using a physical address. Accordingly, the storage device stores an address translation table (also referred to as "forward lookup table") to convert a logical address to a physical address in the system area of the flash memory or the like. When an electronic device accesses data in the storage device, the storage device refers to the address translation table, and accesses a physical address corresponding to a logical address specified by the electronic device.

In the memory device (hereinafter, "memory") of the storage device and the like such as a dynamic random access memory (DRAM) and a flash memory, it may sometimes happen that a stored bit is inverted due to static electricity, resulting in a bit error. If a bit error occurs in entry data of the address translation table, proper data access is not available. For this reason, entry data in the address translation table is assigned an error detecting code (EDC) for detecting a bit error and an error correcting code or an error control code (ECC) for correcting a bit error if any.

The memory of the storage device has an increasingly larger capacity, and a bit error is less and less likely to occur. As the memory capacity increases, entries increase in the address translation table. The error correcting code is larger in data size than the error detecting code, and its data amount is non-negligible. Although the occurrence rate of bit error is decreasing from year to year, there has been no other way than to use the error correcting code assigned to entry data in the address translation table to correct a bit error that occurs infrequently in the entry data.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 3 is an exemplary conceptual diagram of entry data in an address translation table in the embodiment;

FIG. 4 is an exemplary conceptual diagram of entry data in an active page bit map in the embodiment;

FIG. 6 is an exemplary schematic diagram for explaining entry data check in the embodiment;

DETAILED DESCRIPTION

In general, according to one embodiment, a device comprises an error detector, a check module, and a replacement module. The error detector is configured to detect a bit error that occurs in entry data related to conversion to a physical address corresponding to a logical address based on an error detecting code assigned to the entry data. The check module is configured to check whether data obtained by inverting a predetermined bit contained in the entry data where the bit error is detected is normal entry data. The replacement module is configured to replace the entry data where the bit error is detected with the normal entry data.

Exemplary embodiments will be described in detail below with reference to the accompanying drawings. The following embodiments will be described as being applied to a semiconductor storage device as typified by, for example, a solid-state drive (SSD) provided with a flash memory, they may also be applied to any storage device such as a hard disk drive (HDD) that performs data access using an address translation table to convert a logical address to a physical address.

Figure 1:
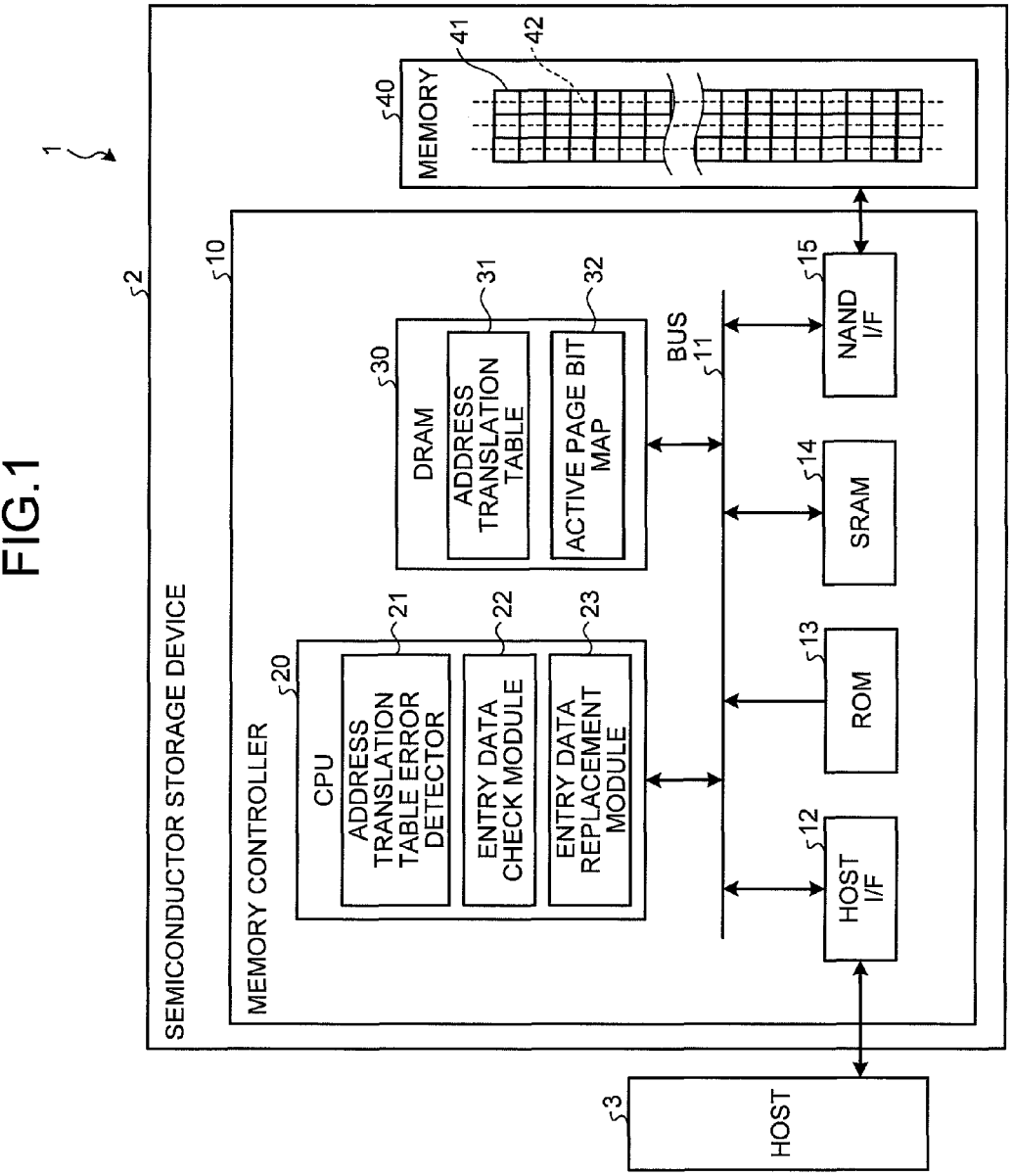
FIG. 1 is an exemplary block diagram of a configuration of a semiconductor storage device according to an embodiment.

FIG. 1 is a block diagram illustrating a configuration of a semiconductor storage device 2 according to an embodiment. The semiconductor storage device 2 is configured to be installed in an electronic device 1 such as a personal computer (PC) or a digital camera, and may be an embedded memory functioning as an external storage device of the electronic device 1. The semiconductor storage device 2 may also be a memory card configured to be removably connected to a host 3 of the electronic device 1 such as a central processing unit (CPU).

The semiconductor storage device 2 comprises a memory 40 and a memory controller 10. The memory 40 is a nonvolatile memory such as a flash memory including a flash electrically erasable programmable read-only memory (EEPROM). The memory 40 is, for example, a NAND flash memory having a structure in which a plurality of memory cells 41 as unit cells are arranged in a matrix at cross points of bit lines (not illustrated) and word lines 42. Data is deleted from the memory 40 in units of physical block formed of a plurality of unit cells. The memory 40 comprises a plurality of physical blocks. Data is written to/read from the memory 40 in units of physical page (hereinafter, simply referred to as "page") specified by a physical address. A plurality of pages constitute a single physical block, and accordingly, a page is smaller in size than a physical block.

Figure 2:
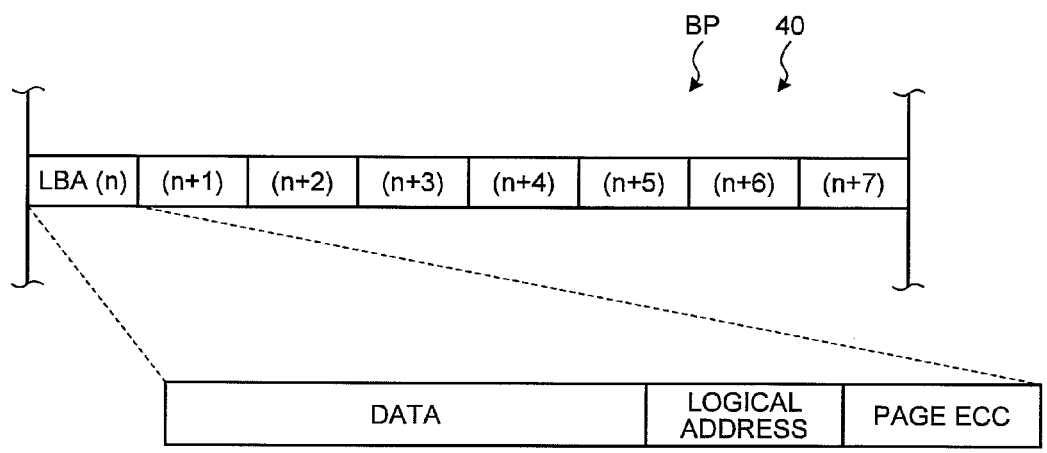
FIG. 2 is an exemplary conceptual diagram of a page of a memory in the embodiment.

FIG. 2 is a conceptual diagram of an example of a page BP of the memory 40. As illustrated in FIG. 2, the one page BP of the memory 40 contains a total of eight logical block addresses LBA (hereinafter, "logical addresses") that can be handled by the host 3. In the example of FIG. 2, logical addresses LBA(n) to LBA(n+7) are arranged in the page BP. A memory area corresponding to each of the logical addresses in the page BP stores, in addition to data stored correspondingly to the logical address, the logical address and a page error correcting code or error control code (ECC) for correcting an error in the page. A system area to be used by the memory controller 10 and a user area available to the user are secured in advance in the memory area of the memory 40. The page BP that is accessed with a logical address handled by the host 3 is located in the user area.

As illustrated in FIG. 1, the memory controller 10 comprises a CPU 20 as a controller, a dynamic random access memory (DRAM) 30, a host interface (I/F) 12, a ROM 13, a static random access memory (SRAM) 14, and a NAND I/F 15, which are connected via a bus 11.

The host I/F 12 controls data communication with the host 3 under the control of the CPU 20. The ROM 13 stores in advance various programs and setting information. The SRAM 14 provides an area such as a command queue to temporarily store a command from the host 3. The NAND I/F 15 accesses the memory 40 as a NAND flash memory under the control of the CPU 20.

The CPU 20 sequentially executes the programs read from the ROM 13 when power is turned on, thereby controls the overall operation of the semiconductor storage device 2. More specifically, when power is turned on, the CPU 20 loads an address translation table 31 and an active page bit map 32 from the system area of the memory 40 into the DRAM 30. After that, upon receipt of an instruction from the host 3 to read/write data from/to a specified logical address, the CPU 20 refers to data having an entry in the address translation table 31 (hereinafter, "entry data"). Thus, the CPU 20 controls data access to a page corresponding to the logical address specified by the host 3. In response to the read/write operation, the CPU 20 updates the active page bit map 32 to manage active pages currently used in the memory 40.

FIG. 3 is a conceptual diagram illustrating an example of entry data in the address translation table 31. As illustrated in FIG. 3, the address translation table 31 is table data to specify a page in the memory 40 from a logical address (LBA). In the address translation table 31, groups of eight logical addresses are arranged in order, and a page is defined for each group of eight logical addresses. That is, one entry defines address conversion for one page corresponding to eight logical addresses. For example, with respect to the logical addresses LBA(n) to LBA(n+7), the page BP corresponding thereto is defined.

One set of entry data is composed of 32 bits with bit numbers 0 to 31. Bits 0 to 5 represent a page number. Bits 6 to 18 represent a block number indicating a physical block. Bits 19 to 23 represent a chip number indicating a chip having the physical block. Bits 24 to 28 represent a channel number indicating a channel (the memory cell 41) to connect to the chip. Bits 29 and 30 are yet to be defined. Bit 31 indicates a parity bit (P) that is an error detecting code for detecting an error in the entry data. With the page number, the block number, the chip number, and the channel number, access becomes available to the page BP corresponding to the logical addresses. If a bit of any bit number is inverted in the entry data and thereby a bit error occurs, the bit error can be detected with reference to the parity bit. While an example is described herein where a parity bit is used as an error detecting code, needless to say, other codes than the parity bit can be used.

FIG. 4 is a conceptual diagram of an example of entry data in the active page bit map 32. As illustrated in FIG. 4, the active page bit map 32 has a bit width of 32 bits. In the active page bit map 32, one set of entry data is composed of 32 bits with bit numbers 0 to 31, and a single bit defines whether a page is active (in use) or inactive (not in use). More specifically, bits 0 to 23 of entry data in the first row define whether pages 0 to 23 are active or inactive, respectively, by 0 or 1. Bits 0 to 23 of entry data in the second row define whether pages 24 to 47 are active or inactive, respectively, by 0 or 1. Bits 24 to 31 are used for an error correcting code for correcting an error in the entry. In this manner, the active page bit map 32 defines whether each of pages is active or inactive by 0 or 1 to manage the pages.

The CPU 20 switches a bit of the active page bit map 32 corresponding to a page, to/from which data is written/read, to 0 or 1 to manage active pages currently used in the memory 40. For example, by switching a bit of the active page bit map 32 corresponding to a page, to which data is written, to 1, the CPU 20 sets the page as an active page. On the other hand, by switching a bit of the active page bit map 32 corresponding to a page, from which data is read and rewritten to another page or data is deleted, to 1, the CPU 20 sets the page as an inactive page.

The CPU 20 stores the address translation table 31 and the active page bit map 32 loaded in the DRAM 30 in the system area of the memory 40 at regular time intervals while power is ON or upon receipt of an instruction from the host 3 to turn off power. In this manner, when power is turned off, the address translation table 31 and the active page bit map 32 loaded in the DRAM 30 are saved in the system area of the memory 40. Thus, consistency of data access to the memory 40 is ensured when power is turned on next time.

The CPU 20 sequentially executes the programs read from the ROM 13, thereby implementing the functions of an address translation table error detector 21, an entry data check module 22, and an entry data replacement module 23.

The address translation table error detector 21 detects, based on an error detecting code assigned to entry data in the address translation table 31, whether a bit contained in the entry data is inverted and thereby a bit error occurs. More specifically, with reference to a parity bit assigned to the entry data in the address translation table 31, the address translation table error detector 21 determines whether the parity calculated from all bits that constitute the entry data matches the parity indicated by the parity bit to detect a bit error. The address translation table error detector 21 may perform bit error detection when entry data is read from a logical address specified by the host 3, when the address translation table 31 is loaded from the system area of the memory 40 into the DRAM 30 at the time power is turned on, when the address translation table 31 loaded in the DRAM 30 is stored in the system area of the memory 40 when power is turned off, or at regular time intervals.

When a bit error is detected in entry data of the address translation table 31, the entry data check module 22 checks whether data obtained by inverting a predetermined bit contained in the entry data is normal entry data. More specifically, the entry data check module 22 generates a check value by sequentially inverting bits of the entry data in which a bit error is detected one by one, and checks whether the check value is normal entry data.

For example, if a page indicated by the generated check value indicates a preset user area, it is expected that the erroneous bit is inverted, which makes the entry data normal. Thus, the entry data check module 22 determines that the check value is normal entry data. On the other hand, if a page indicated by the generated check value indicates a preset system area, it is expected that a bit other than the erroneous bit is inverted. Thus, the entry data check module 22 determines that the check value is erroneous.

Besides, if a page indicated by the generated check value is managed as an active page by the active page bit map 32, it is expected that the erroneous bit is inverted, which makes the entry data normal. Thus, the entry data check module 22 determines that the check value is normal entry data. On the other hand, if a page indicated by the generated check value is managed as an inactive page by the active page bit map 32, it is expected that a bit other than the erroneous bit is inverted. Thus, the entry data check module 22 determines that the check value is erroneous.

Further, the entry data check module 22 reads a logical address stored in a page indicated by the generated check value, and determines the read logical address matches a logical address related to the entry data in which a bit error is detected. As a result of the determination, if the logical addresses match, it is expected that the erroneous bit is inverted, which makes the entry data normal. Thus, the entry data check module 22 determines that the check value is normal entry data. On the other hand, if the logical addresses do not match, it is expected that a bit other than the erroneous bit is inverted. Thus, the entry data check module 22 determines that the check value is erroneous.

When the address translation table error detector 21 detects a bit error in entry data of the address translation table 31, the entry data replacement module 23 replaces the entry data with normal entry data checked by the entry data check module 22. With this, the semiconductor storage device 2 can correct a bit error that occurs in entry data of the address translation table 31 without assigning an error correcting code of large data size to the entry data.

Figure 5:
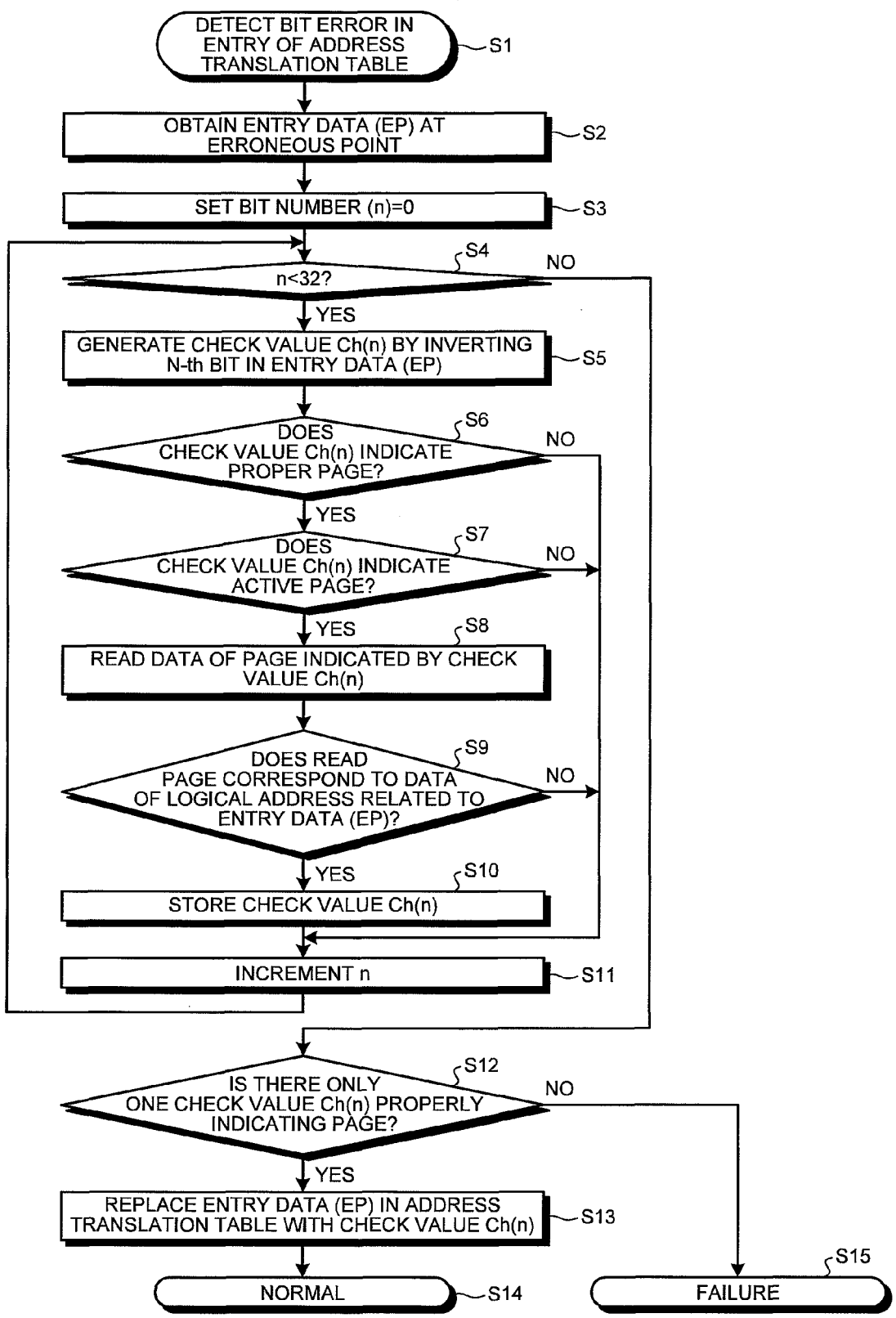
FIG. 5 is an exemplary flowchart of the operation of the semiconductor storage device in the embodiment.

In the following, an example of the operation of the semiconductor storage device 2 will be described in detail with reference to FIG. 5. FIG. 5 is a flowchart of the operation of the semiconductor storage device 2. As illustrated in FIG. 5, in the semiconductor storage device 2, the process starts when the address translation table error detector 21 detects a bit error in an entry of the address translation table 31 (S1).

The entry data check module 22 obtains entry data (EP) at an erroneous point where the address translation table error detector 21 has detected the bit error (S2). To check the entry data by sequentially inverting the bits thereof one by one, the entry data check module 22 sets a bit number (n) of a bit to be inverted to 0 (S3). That is, at S3, the entry data check module 22 starts the check from a bit with the bit number (n)=0. While an example will be described in which the bit number is sequentially incremented from 0 to 31 during the check, the bit number of a bit to be inverted may be selected at random.

The entry data check module 22 determines whether the bit number (n) of a bit to be inverted satisfies n<32 (S4). If n=32 (No at S4), it means that all bits contained in the entry data have been sequentially inverted. Thus, the process moves to S12 without the process from S5 to S11. On the other hand, if n<32 (Yes at S4), the bits contained in the entry data are being sequentially inverted, and the process is continued to S5 to S11.

The entry data check module 22 generates a check value Ch(n) by inverting a bit with the bit number (n) in the entry data (EP) where the bit error has been detected (S5). The entry data check module 22 then determines whether the generated check value Ch(n) indicates a proper page such as a preset user area (S6). If the check value Ch(n) indicates a proper page (Yes at S6), it is expected that the check value Ch(n) is normal, and the process moves to S7. If the check value Ch(n) does not indicate a proper page (No at S6), it is expected that the check value Ch(n) is not normal, and the process moves to S11. Then, the bit number n is incremented (S11), and the process returns to S4 to check a check value obtained by inverting a bit with the next bit number.

The entry data check module 22 determines whether a page indicated by the check value Ch(n) is managed by the active page bit map 32 as an active page (S7). If the page is managed as an active page (Yes at S7), it is expected that the check value Ch(n) is normal, and the process moves to S8. If the page is managed as an inactive page (No at S7), it is expected that the check value Ch(n) is not normal, and the process moves to S11. Then, the bit number n is incremented (S11), and the process returns to S4 to check a check value obtained by inverting a bit with the next bit number.

The entry data check module 22 reads data of the page indicated by the check value Ch(n) from the memory 40 (S8). The entry data check module 22 then determines whether the page read based on the check value Ch(n) corresponds to data of a logical address related to the entry data (EP) where the bit error has been detected (S9). More specifically, the entry data check module 22 determines whether a logical address stored in the read page matches a logical address related to the entry data (EP) where the bit error has been detected.

If the logical addresses match (Yes at S9), it is expected that the check value Ch(n) is normal. Accordingly, the entry data check module 22 temporarily stores the check value Ch(n) in the SRAM 14 or the DRAM 30 as normal entry data (S10). Next, the process moves to S11, the bit number n is incremented (S11), and the process returns to S4 to check a check value obtained by inverting a bit with the next bit number. If the logical addresses do not match (No at S9), it is expected that the check value Ch(n) is not normal, and the process moves to S11. Then, the bit number n is incremented (S11), and the process returns to S4 to check a check value obtained by inverting a bit with the next bit number.

In the above process from S5 to S10, if the generated check value Ch(n) satisfies all the conditions by the determination at S6, S7, and S9, it is determined that the check value is normal entry data.

When all the bits contained in the entry data have been sequentially inverted, and thereby the check is completed, the entry data replacement module 23 determines whether the SRAM 14 or the DRAM 30 temporarily stores only one check value Ch(n) as normal entry data (S12). If only one check value is stored (Yes at S12), the entry data replacement module 23 replaces the entry data (EP) in the address translation table 31 where the address translation table error detector 21 has detected the bit error with the check value Ch(n) checked by the entry data check module 22 as normal entry data (S13). Then, the process ends normally (S14).

Although the error detecting code such as a parity bit can detect that a bit error occurs in any bit of entry data, it cannot specify the number of bits where a bit error occurs. Therefore, if it is determined that there is only one check value Ch(n) determined as normal entry data at S12, the erroneous entry data is replaced with the check value Ch (n). Since the probability that a bit error occurs in a plurality of bits of entry data is almost 0, the above process can restore erroneous entry data to its normal state.

If not only one check value is stored (No at S12), the CPU 20 determines that the entry data of the address translation table 31 cannot be restored and it is a failure (S15). Then, the process ends. In this case, the erroneous entry data cannot be restored to its normal state with the process from S4 to S11, and thus restoration, such as to format the memory 40 by rebooting, is performed.

A description will be given of an example of the entry data check illustrated in FIG. 5. FIG. 6 is a conceptual diagram illustrating an example of the entry data check.

As illustrated in FIG. 6, it is assumed that a bit error ER occurs in the t-th bit of entry of LBAx to LBA(x+7). In the process from S4 to S11 of FIG. 5, 0th to 31st bits of entry data of LBAx to LBA(x+7) are sequentially inverted to sequentially generate check values Ch(0) to Ch(31) for check. In the check, a check value Ch(t) obtained by inverting the t-th bit satisfies all the conditions by the determination at S6, S7, and S9. Thus, the entry data is replaced with the check value Ch(t).

Figure 7:
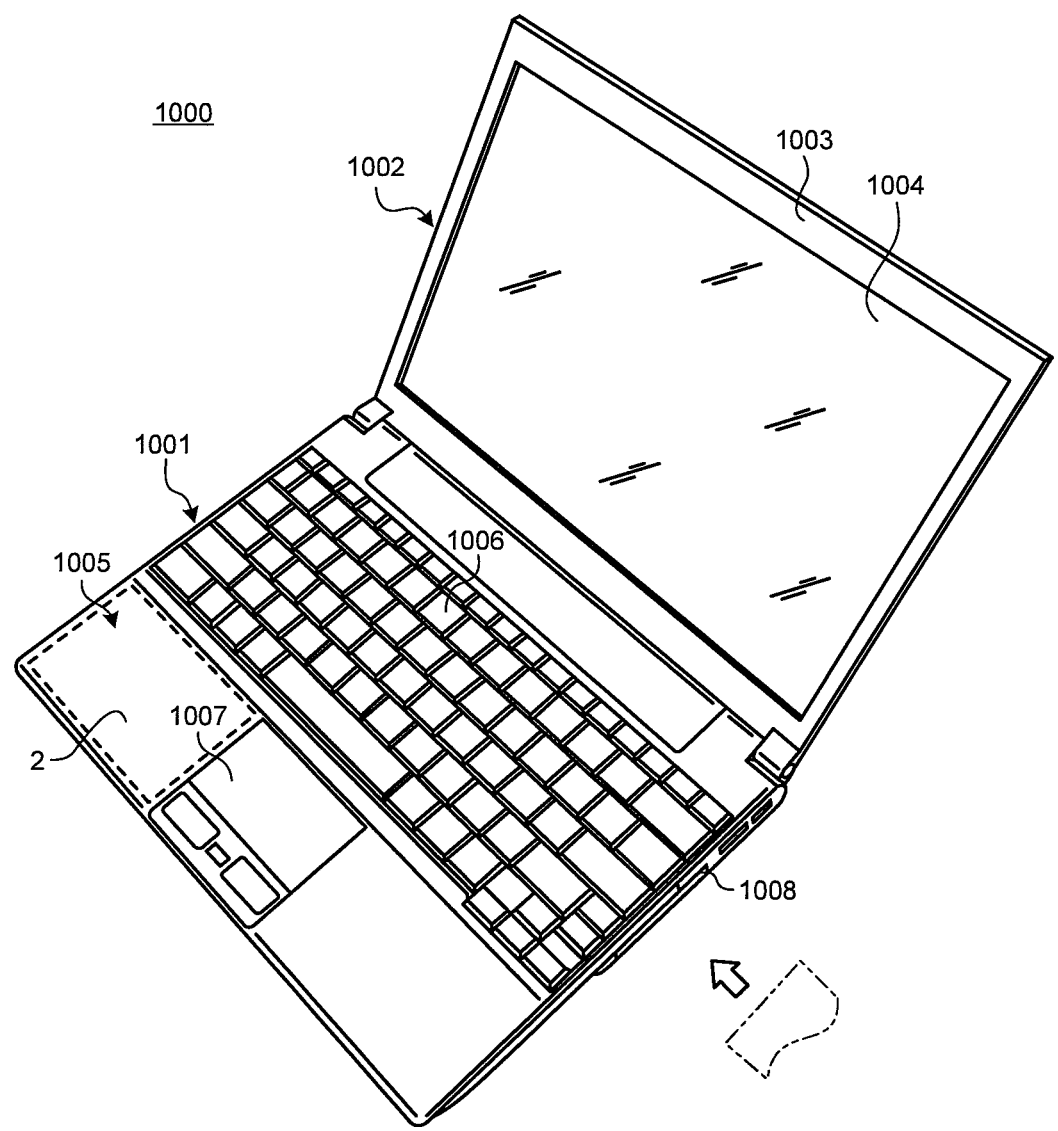
FIG. 7 is an exemplary perspective view of a personal computer (PC) provided with the semiconductor storage device in the embodiment.

In the following, a notebook PC will be described as an example of the electronic device 1 comprising the semiconductor storage device 2 as described above. FIG. 7 is a perspective view of an example of a PC 1000 provided with the semiconductor storage device 2.

The PC 1000 comprises a main body 1001 and a display module 1002. The display module 1002 comprises a display housing 1003 and a display device 1004 housed in the display housing 1003.

The main body 1001 is provided with a housing 1005, a keyboard (KB) 1006, and a touch pad 1007 as a pointing device. The housing 1005 houses therein a main circuit board, an optical disk device (ODD) module, a card slot, the semiconductor storage device 2, and the like.

The card slot is located adjacent to the peripheral wall of the housing 1005. An opening 1008 to the card slot is formed on the peripheral wall. An additional device can be inserted into the card slot via the opening 1008 from the outside of the housing 1005.

The semiconductor storage device 2 may be used as being installed inside the PC 1000 as a replacement of the HDD, or may be used as being inserted in the card slot of the PC 1000 as an additional device.

Figure 8:
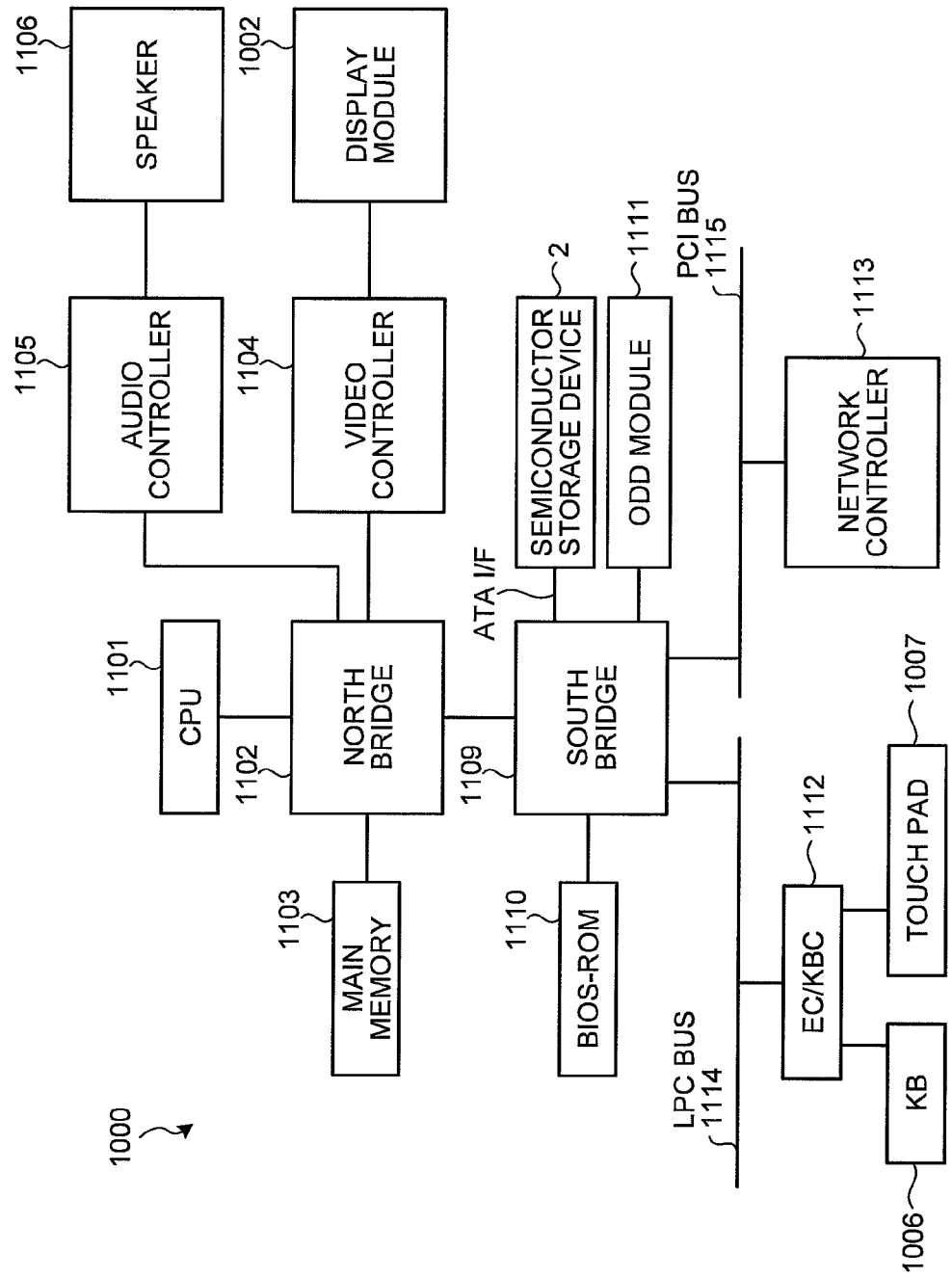
FIG. 8 is an exemplary block diagram of a system configuration of the PC provided with the semiconductor storage device in the embodiment.

FIG. 8 is a block diagram of an example of a system configuration of the PC 1000 provided with the semiconductor storage device 2. The PC 1000 comprises a CPU 1101, a north bridge 1102, a main memory 1103, a video controller 1104, an audio controller 1105, a speaker 1106, a south bridge 1109, a basic input-output system (BIOS)-ROM 1110, the semiconductor storage device 2, an ODD module 1111, an embedded controller/keyboard controller (EC/KBC) 1112, a network controller 1113, a low pin count (LPC) bus 1114, and a peripheral component interconnect (PCI) bus 1115.

Under the control of the CPU 1101, the PC 1000 accesses the semiconductor storage device 2 in units of sector (logical address). For example, through a serial advanced technology attachment (SATA) interface, a command with respect to a specific logical address, such as a write command, a read command, a flash command, or the like, is input to the semiconductor storage device 2. In the semiconductor storage device 2, the CPU 20 refers to the address translation table 31 to perform write/read operation with respect to a physical address corresponding to the specific logical address according to the input command.

Figure 9:
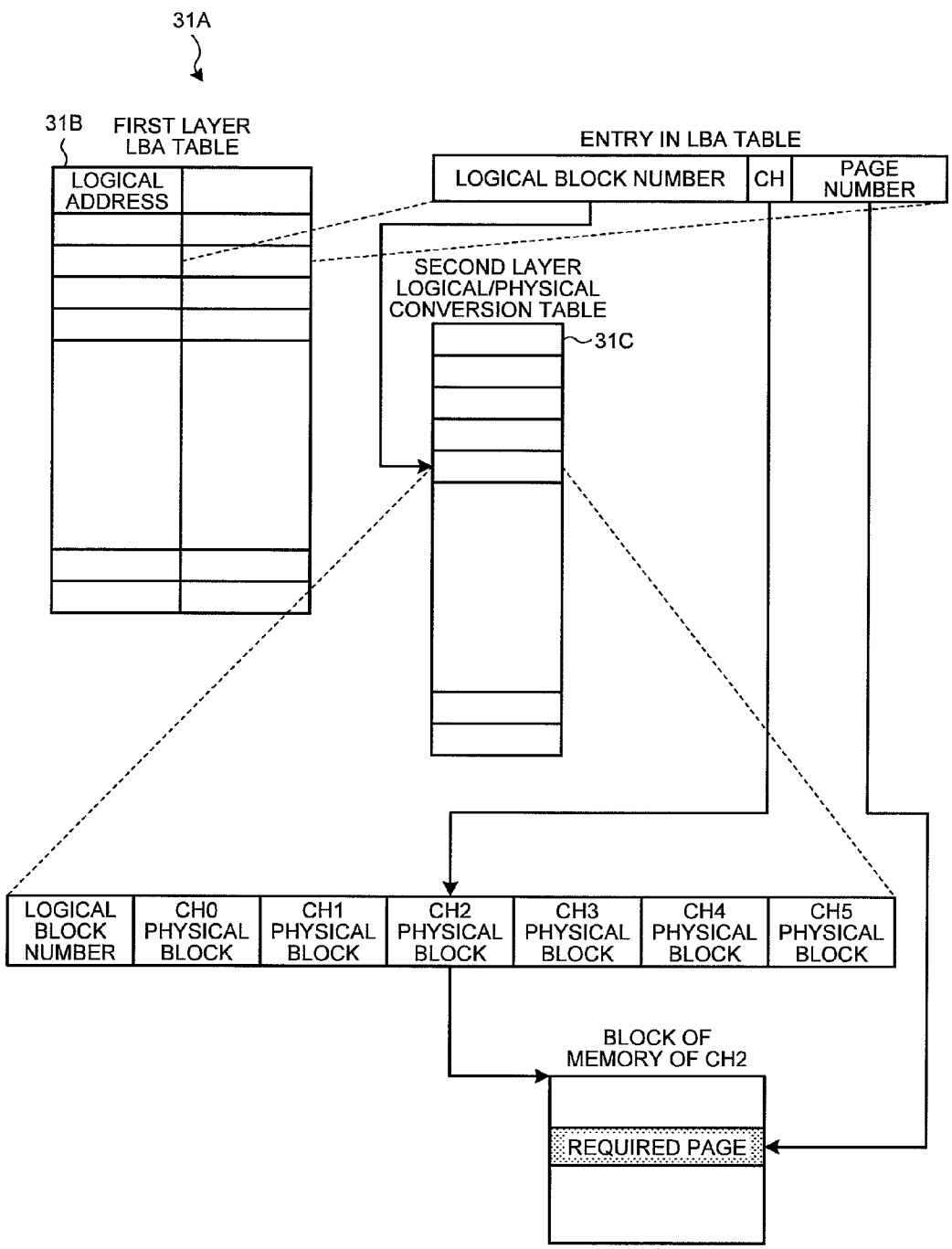
FIG. 9 is an exemplary conceptual diagram of an address translation table according to a modification of the embodiment.

A description will be given of a modification of the address translation table 31 described above. FIG. 9 illustrates an example of an address translation table 31A according to the modification. In the address translation table 31, the association between a logical address and a page is described by a single set of table data. However, as illustrated in FIG. 9, the association between a logical address and a page may be described in a plurality of layers of the address translation table 31A, i.e., a first layer LBA table 31B and a second layer logical/physical conversion table 31C.

More specifically, the address translation table 31A comprises the first layer LBA table 31B and the second layer logical/physical conversion table 31C. The entry of the first layer LBA table 31B includes a logical address as an index, a channel number, a page number assigned to a page, and a logical block number assigned to a logical block where data is stored. The logical address of data to be written is calculated based on a logical address specified by a data write request from the host 3.

The logical block number is identification information to identify data to be written, and, for example, may be assigned to logical blocks in the order in which they are created. In this example, there are channel numbers CH0 to CH5 each indicating a channel to which a physical block is connected that stores data corresponding to the logical address. The page number indicates a page that stores the data corresponding to the logical address in the physical block specified by the logical block number and the channel number. The page number may be assigned in the order of physical addresses, or the physical address of the page may be assigned as the page number.

The second layer logical/physical conversion table 31C contains area specifying information for specifying a plurality of storage areas in the memory 40 to which write data is to be written. The second layer logical/physical conversion table 31C stores a logical block number and physical blocks of channels associated with the logical block in an associated manner. More specifically, the second layer logical/physical conversion table 31C stores the logical block number as an index and the addresses (physical block addresses) of the physical blocks of the channels associated with the logical block. In this structure, using a logical block number stored in an entry of the address translation table 31A corresponding to a certain logical address as an index, an entry of the first layer LBA table 31B related to the logical block is specified based on the index. Subsequently, from among physical blocks stored in an entry of the second layer logical/physical conversion table 31C, a physical block of the memory 40 is specified that is connected to a channel with a channel number stored in the entry of the address translation table 31A. Then, based on a page number contained in the entry of the address translation table 31A, a page to which data corresponding to the logical address is written is specified.

In the address translation table 31A, an error detecting code is assigned to entry data with respect to each of the first layer LBA table 31B and the second layer logical/physical conversion table 31C. Accordingly, if a bit error occurs in entry data of any one of the first layer LBA table 31B and the second layer logical/physical conversion table 31C, the entry data can be replaced with normal one. Incidentally, one of the first layer LBA table 31B and the second layer logical/physical conversion table 31C that has less entries and is smaller in data size may be assigned an error correcting code.

A computer program may be executed on a computer to realize the same function as the semiconductor storage device 2. The computer program may be provided as being stored in advance in ROM or the like. The computer program may also be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The computer program may also be stored in a computer connected via a network such as the Internet so that it can be downloaded therefrom via the network. Further, the computer program may be provided or distributed via a network such as the Internet.

The computer program comprises modules that implement the above elements (the address translation table error detector 21, the entry data check module 22, and the entry data replacement module 23). As real hardware, the CPU (processor) loads the computer program from the ROM described above into the main memory and executes it. With this, the address translation table error detector 21, the entry data check module 22, and the entry data replacement module 23 are implemented on the main memory.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device comprising:
   an error detector configured to detect a bit error in entry data of an address translation table related to conversion to a physical address corresponding to a logical address, based on an error-detecting code assigned to the entry data without using an error-correcting code;
   a check module configured to check, based on data obtained by inverting one bit among all bits of the entry data of the address translation table and on data read out from the physical address indicated by the obtained data, whether or not the obtained data is normal entry data; and
   a replacement module configured to replace the entry data of the address translation table with the checked normal entry data.

2. The storage device of claim 1, wherein
   the check module is configured to check, by sequentially inverting one bit among all bits of the entry data of the address translation table, whether or not the obtained data is the normal entry data, and
   when the obtained data is determined to be the normal entry data, the replacement module is configured to replace the entry data of the address translation table with the checked normal entry data.

3. The storage device of claim 1, wherein the error-detecting code is a parity bit.

4. The storage device of claim 1, wherein, when the data obtained by inverting one bit among all bits of the entry data of the address translation table is data indicating the physical address of a range, the check module is configured to determine that the obtained data is the normal entry data.

5. The storage device of claim 1, further comprising an address management module configured to manage whether the physical address is active or inactive, wherein
   when the physical address indicated by the data obtained by inverting one bit among all bits of the entry data of the address translation table is managed as the active physical address, the check module is configured to determine that the obtained data is the normal entry data.

6. The storage device of claim 2, further comprising an address management module configured to manage whether the physical address is active or inactive, wherein
   when the physical address indicated by the data obtained by inverting one bit among all bits of the entry data of the address translation table is managed as the active physical address, the check module is configured to determine that the obtained data is the normal entry data.

7. The storage device of claim 1, wherein
   a memory area is configured to store the logical address corresponding to the physical address, wherein the memory area is specified by the physical address, and
   when the logical address read from the memory area specified by the physical address indicated by the data obtained by inverting one bit among all bits of the entry data of the address translation table matches the logical address related to the entry data of the address translation table, the check module is configured to determine that the obtained data is the normal entry data.

8. An electronic device comprising a storage device that comprises:
   an error detector configured to detect a bit error in entry data of an address translation table related to conversion to a physical address corresponding to a logical address, based on an error-detecting code assigned to the entry data without using an error-correcting code;
   a check module configured to check, based on data obtained by inverting one bit among all bits of the entry data of the address translation table and on data read out from the physical address indicated by the obtained data, whether or not the obtained data is normal entry data; and
   a replacement module configured to replace the entry data of the address translation table with the checked normal entry data.

9. The electronic device of claim 8, wherein
   the check module is configured to check, by sequentially inverting one bit among all bits of the entry data of the address translation table, whether or not the obtained data is the normal entry data, and
   when the obtained data is determined to be the normal entry data, the replacement module is configured to replace the entry data of the address translation table with the checked normal entry data.

10. The electronic device of claim 8, wherein the error-detecting code is a parity bit.

11. The electronic device of claim 8, wherein, when the data obtained by inverting one bit among all bits of the entry data of the address translation table is data indicating the physical address of a range, the check module is configured to determine that the obtained data is the normal entry data.

12. The electronic device of claim 8, further comprising an address management module configured to manage whether the physical address is active or inactive, wherein
   when the physical address indicated by the data obtained by inverting one bit among all bits of the entry data of the address translation table is managed as the active physical address, the check module is configured to determine that the obtained data is the normal entry data.

13. The electronic device of claim 9, further comprising an address management module configured to manage whether the physical address is active or inactive, wherein
   when the physical address indicated by the data obtained by inverting one bit among all bits of the entry data of the address translation table is managed as the active physical address, the check module is configured to determine that the obtained data is the normal entry data.

14. The electronic device of claim 8, wherein
a memory area is configured to store the logical address corresponding to the physical address, wherein the memory area is specified by the physical address, and
when the logical address read from the memory area specified by the physical address indicated by the data obtained by inverting one bit among all bits of the entry data of the address translation table matches the logical address related to the entry data, the check module is configured to determine that the obtained data is the normal entry data.

15. A method for correcting data error in a storage device configured to store data, the data error correction method comprising:
detecting a bit error that occurs in entry data of an address translation table related to conversion to a physical address corresponding to a logical address, based on an error-detecting code assigned to the entry data without using an error-correcting code;
checking, based on data obtained by inverting one bit among all bits of the entry data of the address translation table and on data read out from the physical address indicated by the obtained data, whether or not the obtained data is normal entry data; and
replacing the entry data of the address translation table with the checked normal entry data.

16. The data error correction method of claim 15, wherein
checking comprises checking, by sequentially inverting one bit among all bits of the entry data of the address translation table, whether or not the obtained data is the normal entry data, and
replacing the entry data of the address translation table with the checked normal entry data is performed when inversion of only one of the bits provides data determined to be the normal entry data.

17. The data error correction method of claim 15, wherein the error-detecting code is a parity bit.

18. The data error correction method of claim 15, wherein, checking that the obtained data is the normal entry data is performed when the data obtained by inverting one bit among all bits of the entry data of the address translation table is data indicating the physical address of a range.

19. The data error correction method of claim 15, further comprising managing whether the physical address is active or inactive, wherein
checking that the obtained data is the normal entry data is performed when the physical address indicated by the data obtained by inverting one bit among all bits of the entry data of the address translation table is managed as the active physical address.

20. The data error correction method of claim 15, wherein
the logical address corresponding to the physical address is stored in a memory area specified by the physical address, and wherein
checking that the obtained data is the normal entry data is performed when the logical address read from the memory area specified by the physical address indicated by the data obtained by inverting one bit among all bits of the entry data of the address translation table matches the logical address related to the entry data of the address translation table.

* * * * *